(12) United States Patent
Bünis et al.

(10) Patent No.: US 6,979,377 B2
(45) Date of Patent: Dec. 27, 2005

(54) METHOD FOR PRODUCING COMPONENTS FROM FIBER-REINFORCED COMPOSITE CERAMIC AND METHODS FOR USING THE COMPONENTS

(75) Inventors: Rainer Bünis, Dasing (DE); Günther Waliczek, Meitingen (DE)

(73) Assignee: SGL Carbon AG, Wiesbaden (DE)

( * ) Notice: Subject to any disclaimer, the term of this patent is extended or adjusted under 35 U.S.C. 154(b) by 28 days.

(21) Appl. No.: 10/681,534

(22) Filed: Oct. 8, 2003

(65) Prior Publication Data
US 2004/0069398 A1    Apr. 15, 2004

(30) Foreign Application Priority Data
Oct. 8, 2002 (DE) ............................... 102 46 851

(51) Int. Cl.[7] .......................... B31F 1/00; C04B 35/52; C04B 35/83; B64C 1/00
(52) U.S. Cl. .................. 156/89.26; 156/210; 264/29.1; 264/29.5; 264/29.6; 264/629; 264/630
(58) Field of Search ........................ 156/89.25, 89.26, 156/196, 197, 210, 214; 264/629, 630, 291, 264/29.2, 29.3, 29.4, 29.5, 29.6, 29.7

(56) References Cited

U.S. PATENT DOCUMENTS

| | | | |
|---|---|---|---|
| 5,354,394 A | * | 10/1994 | Seebo et al. ................ 156/358 |
| 5,360,500 A | * | 11/1994 | Evans et al. .................. 156/74 |
| 5,490,892 A | * | 2/1996 | Castagnos et al. ........ 156/89.26 |
| 5,685,936 A | * | 11/1997 | Komine et al. ............. 156/182 |
| 5,893,955 A | * | 4/1999 | Rousseau et al. ........ 156/89.22 |
| 5,935,376 A | * | 8/1999 | Fell .......................... 156/379.8 |
| 6,110,535 A | * | 8/2000 | Rey et al. ................ 427/383.3 |

FOREIGN PATENT DOCUMENTS

| | | |
|---|---|---|
| DE | 197 37 212 A1 | 3/1999 |
| JP | 59-69410 * | 4/1984 |
| JP | 5-124874 * | 5/1993 |

* cited by examiner

Primary Examiner—Melvin Mayes
(74) Attorney, Agent, or Firm—Laurence A. Greenberg; Werner H. Stemer; Ralph E. Locher

(57) ABSTRACT

A method produces components from high-temperature-proof fiber reinforced composite ceramics from tapes containing carbon fibers. Heating and simultaneously compacting under the influence of pressure and temperature produces a force-locking connection in the region of the contact zones. The prebody is carbonized. At least one post-compaction of the prebody is followed by a carbonization of the prebody, in which the tapes are separated from the adjoining tapes in the region outside the contact zones by graphite spacers and inserted into a clamping device. The clamping device is made substantially of graphite. As a result, the tapes and the prebody that is formed therefrom are securely fixed during the processing steps. The components can be utilized as workpiece carriers, carriers for optical components, and in the aerospace field.

24 Claims, 6 Drawing Sheets

METHOD FOR PRODUCING COMPONENTS FROM FIBER-REINFORCED COMPOSITE CERAMIC AND METHODS FOR USING THE COMPONENTS

BACKGROUND OF THE INVENTION

FIELD OF THE INVENTION

The invention relates to a method for producing components from fiber-reinforced composite ceramic.

German published, non-prosecuted patent application DE 197 37 212 A1 describes a method for producing a workpiece carrier from heat resistant fiber ceramic material with a honeycomb structure for the thermal processing of workpieces. The workpiece carrier is constructed in one piece in monolithic form, or it is formed from individual fiber composite ceramic elements that are constructed in one piece in monolithic form, for instance from CFRC (carbon-fiber-reinforced carbon), and fiber composite ceramic support profiles in the form of bars, strips, or tubes that are inserted into these elements in boreholes and that hold them together. A "one-piece monolithic" form refers to a jointless configuration. According to one of the inventive variants, meandering strip-shaped monolithic parts are fixed relative to one another with screws. In a further preferred variant, fiber bundles that have been soaked in binder are wound onto polygonal, for instance honeycomb shaped, cores, producing honeycomb shaped hollow profiles. The still wet hollow profiles are then joined, compacted, and hardened.

A heat resistant fiber composite ceramic material is obtainable by the carbonization of carbon fiber reinforced plastics (CFRP), the organic material being converted into a non-volatile carbon residue during thermal treatment above 750° C. under non-oxidizing conditions, producing a carbon fiber reinforced carbon (CFRC). Owing to the separation of the volatile components, this process leads to a shrinkage of material, which leads to warping of the body. German Application NO. DE 197 37 212 A1 does not describe any solution for carbonizing components with complex structures such as honeycomb structures without warping.

SUMMARY OF THE INVENTION

It is accordingly an object of the invention to provide a method for producing components from fiber-reinforced composite ceramic and methods for using the components that overcome the hereinafore-mentioned disadvantages of the heretofore-known methods of this general type and that provide components that are built from a number of repeating structural units by using simple steps. The method guarantees warp-free hardening and thermal processes, namely carbonizing and graphiting, of the preproducts and in-process products of the components.

With the foregoing and other objects in view, there is provided, in accordance with the invention, components, including repeating structural units, that are glued together into a prebody in a high-temperature-proof clamping device with the aid of graphite spacers formed from surface formations containing individual carbon fibers, particularly carbon fiber reinforced plastic (CFRP), or fiber prepregs. The components are glued together with a carbonizable glue or a binder of the surface forms that plasticizes when heated. Each of the fiber formations corresponds to one of the repeating structural units. The fiber formations are glued together in defined contact zones according to the desired structure, whereas the portions of the fiber formations that surround the honeycomb shaped openings in the structure are held the desired distance apart by the spacers. The openings, which are surrounded by the fiber formations that are separated by the graphite spacers, can have cross-sections with a honeycomb, triangular, or quadrilateral (square or rectangular) shape.

This prebody is carbonized and postcompacted and carbonized at least once with a carbonizable carbon precursor while remaining fixed in the clamping device with the aid of graphite spacers. The fixing guarantees that the shrinkage of the prebody material that occurs in connection with the carbonization does not lead to warping of the CFRC body.

The invention thus relates to a method for producing components from high-temperature resistant fiber-reinforced composite ceramic. The method includes the following steps:

the production of corrugated, bent, or meandering tapes from surface formations containing carbon fibers;

the juxtaposing of at least two of the corrugated or meandering tapes in such a way that portions of the surfaces that face one another of two adjoining tapes touch in contact zones, where the tapes, at least in the region of these contact zones, contain a glue or binder which joins the fibers and which is moldable by using pressure when heated;

producing a force-locking connection between the tapes in the region of the contact zones by heating and simultaneously solidifying while the tapes are exposed to pressure and temperature influences or by hardening so as to form a prebody;

the carbonizing of the prebody at a temperature between 750 and 1200° C. in a non-oxidizing atmosphere;

at least one postcompaction of the prebody by infiltration or impregnation with a meltable or gaseous substance which forms a carbon residue ("carbon precursor") during heating in a non-oxidizing atmosphere, followed by a carbonization of the prebody thus processed;

characterized in that, in the region outside the contact zones, the tapes are at least partly separated from the adjoining tapes by graphite spacers and inserted into a clamping device substantially formed from graphite, the tapes and the prebodies that are formed from them being thus securely fixed during the steps.

A force-locking connection is one that connects two elements together by force external to the elements, as opposed to a form-locking connection, which is provided by the shapes of the elements themselves.

The oxidation resistance and wear resistance of the resulting CFRC component can potentially be further improved in an additional step by graphiting or infiltration followed by reaction with a carbide forming element. The element preferably permeates the entire component but at least its outer layer close to the surface and forms a carbide in the subsequent reaction with at least a portion of the carbon in the matrix, such that after the reaction the matrix contains the formed carbide, the carbide forming element, and potential residues of non-converted carbon. The utilization of silicon as the carbide-forming element is particularly preferred. The treatment that is performed therewith is also referred to as surface silication or depth silication.

Other features that are considered as characteristic for the invention are set forth in the appended claims.

Although the invention is illustrated and described herein as embodied in a method for producing components from fiber-reinforced composite ceramic and methods for using the components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
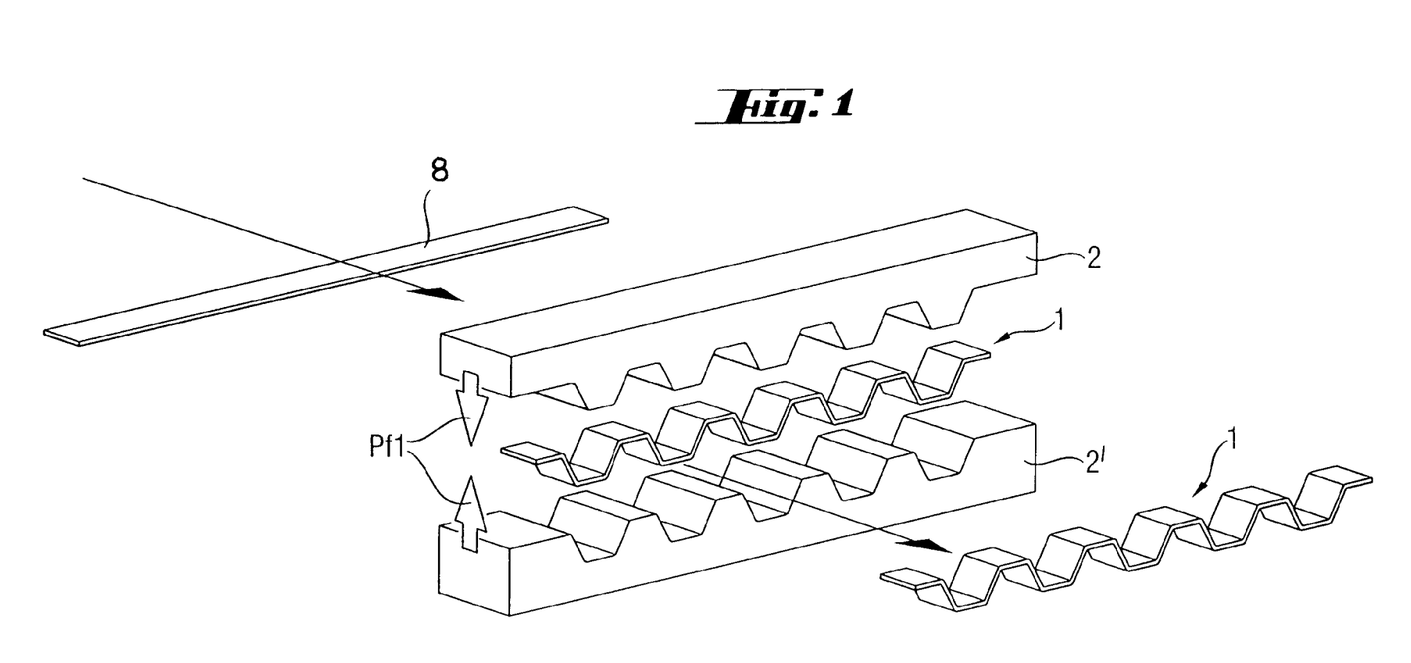
FIG. 1 is a perspective view showing the production of a corrugated fiber formation.

Referring now to the figures of the drawings in detail and first, particularly to FIG. 1 thereof, there is shown a first embodiment of the method. The prebody 10 is produced by the production of corrugated, bent or meandering tapes 1 formed from surface formations 8 containing carbon fibers by dieing (in the direction of arrow Pf1) with embossing tools 2, 2 (FIG. 1) or by pleating, whereby the tapes may already contain a hardenable binder. The tapes 1, 1 correspond to the repeating structural units of the component that is being produced.

Figure 2:
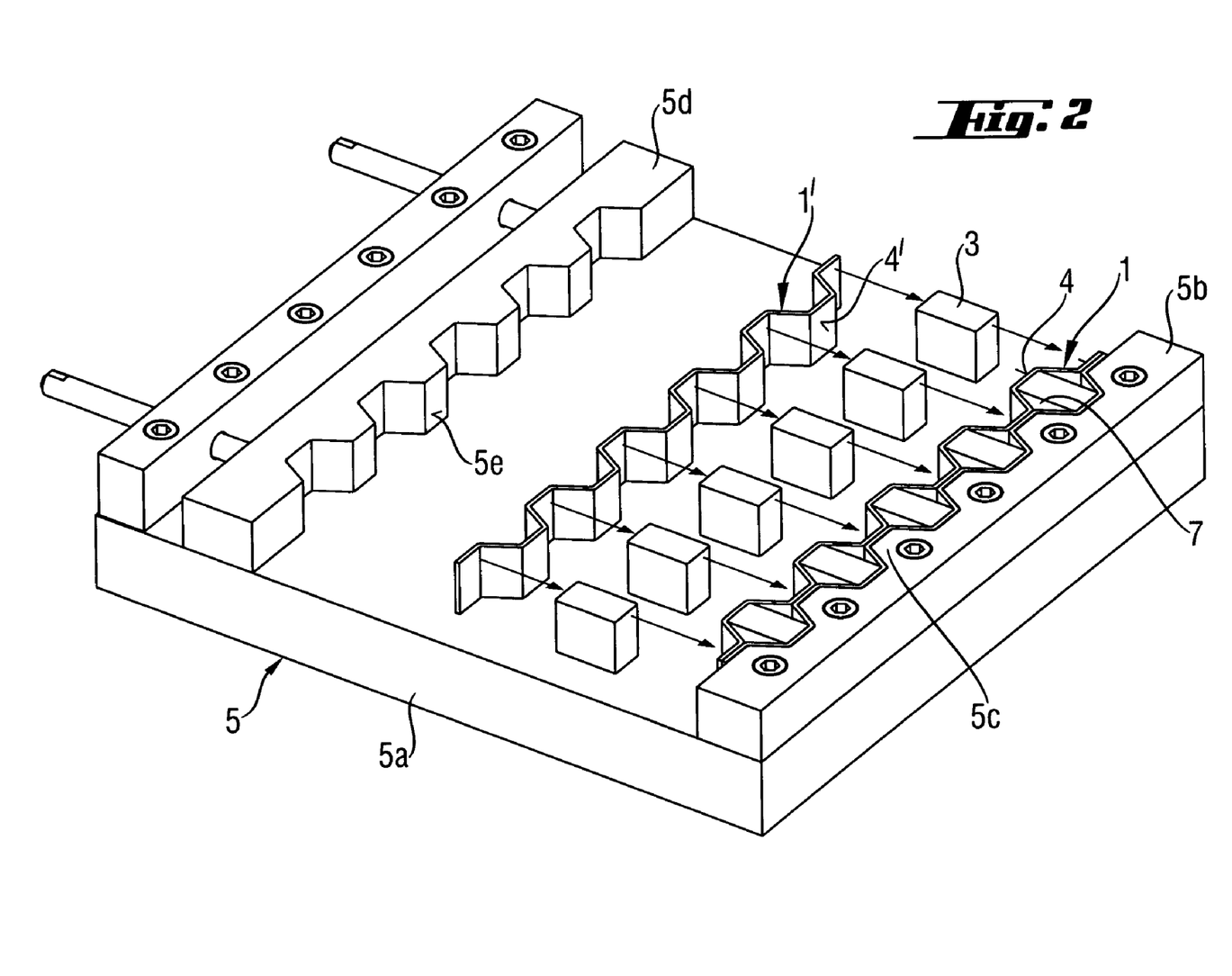
FIG. 2 is a perspective view showing the juxtaposition of corrugated fiber formations, which are partly separated by spacers, according to the invention.

As represented in FIG. 2, these tapes 1, 1 are juxtaposed with the aid of graphite spacers 3 in a high-temperature-proof graphite clamping device 5 in such a way that two adjoining tapes 1, 1 touch only partly, namely in the contact zones 4, 4, and are agglutinated by using a carbonizable binder in the region of these contact zones 4, 4. Outside the contact zones 4, 4, the tapes 1, 1 are held the desired distance apart by graphite spacers 3.

Figure 3:
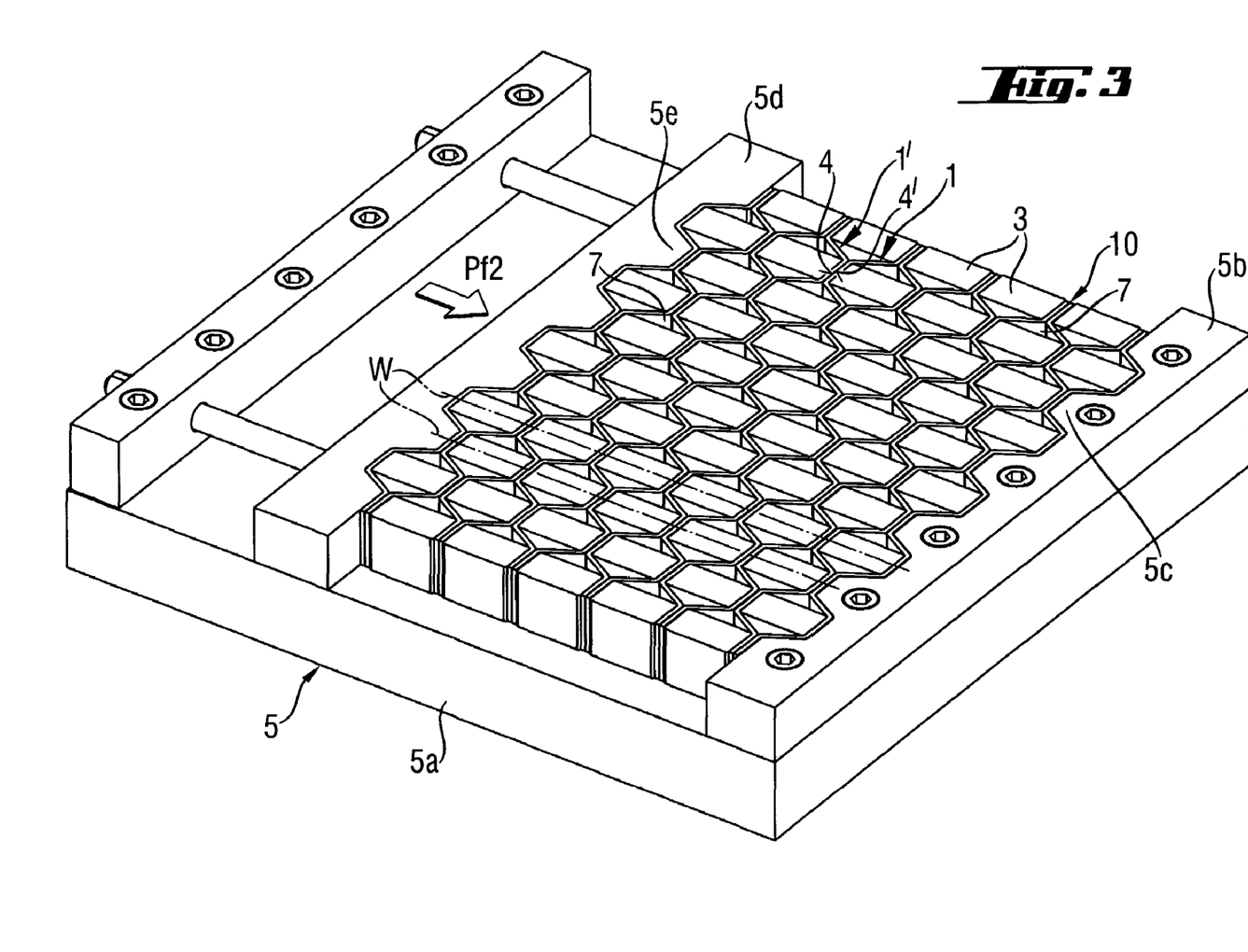
FIG. 3 is a perspective view showing a clamping device made from graphite with a first embodiment of a honeycomb structure produced by agglutinating corrugated fiber formations and spacers.
Figure 4:
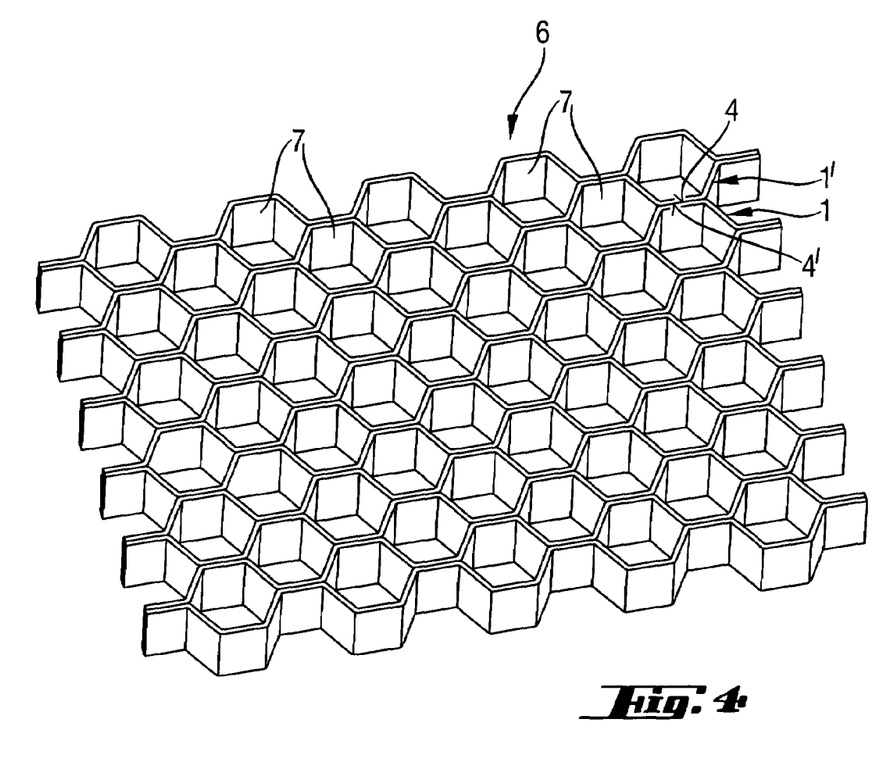
FIG. 4 is a perspective view of a honeycomb structure that is produced by the agglutination of fiber formations.

FIG. 3 represents the clamping device 5 in which the corrugated tapes are positioned and agglutinated and the resulting prebody 10 is then carbonized and, if necessary, graphited and/or silicated.

As schematically represented in FIGS. 2 and 3, the clamping device 5 is formed substantially by a base plate or frame 5a that includes a stationary overarm 5b on one end with a profiling 5c that fits the shape of the tapes 1, and a moving die 5d on the other end, also with a profiling 5e that fits the shape of the tapes 1. The cavities 7 that are to be surrounded by the tapes 1, 1 are filled by the spacers 3, so that the shape of the tapes 1, 1 is stabilized during subsequent processing. Following the laying of the last tape, a mold pressure is exerted with the movable die 5d such that the tapes 1, 1 are joined into the prebody 10 at their contact points 4, 4. As represented by the working line W in FIG. 3, the mold pressure (arrow P2) that is exerted by the die 5d is continuously induced into all regions of the tapes 1, 1 that include contact surfaces 4, 4 ; i.e., the mold pressure is induced in the correspondingly profiled overarm 5b by way of a series of spacers 3 with the contact zones 4, 4 of the tapes 1, 1 between them. The spacers 3 need not precisely fit the cavity 7 that is to be formed. Only the regions of the contact zones 4, 4 that are joined by intensive pressure are critical.

Figures 5, 6, 7:
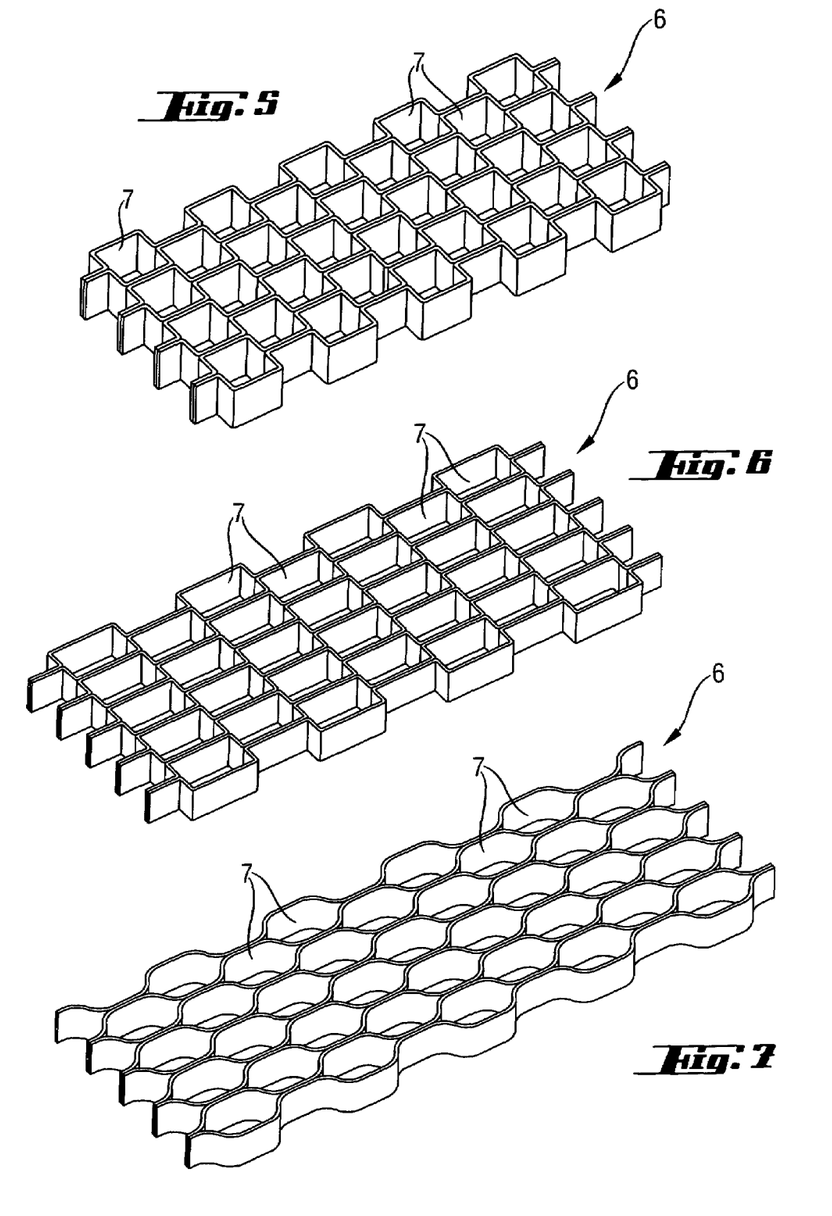
FIG. 5 is a perspective view of a component with square openings that was produced by the agglutination of fiber formations.
FIG. 6 is a perspective view of a component with rectangular openings that was produced by the agglutination of fiber formations.
FIG. 7 is a perspective view showing a component with round openings that was obtained by the agglutination of fiber formations.

FIGS. 4 to 7 exemplarily represent components 6 that can be produced by the inventive method. The openings 7 of the component 6 that the tapes 1, 1 surround can be honeycomb shaped (FIG. 4), quadrilateral, square (FIG. 5), rectangular (FIG. 6), or round (FIG. 7). Because the tapes are preformed, the spacers 3 need not necessarily have the same shape as the openings 7 that are surrounded by the tapes 1, 1. It is enough to construct the spacers such that they hold the tapes 1, 1 the desired distance apart.

The method includes the repeating sequence of inserting new spacers 3 and attaching a new tape 1 and, if need be, depositing a carbonizable glue if the new tape is not already furnished with glue or binder. The hardening of the glue preferably does not take place with each new tape 1 that is attached, but rather after the attachment of the last tape when the prebody 10 already has its final shape formed by repeating structural units.

The rigidity of the prebody 10 during its construction can be enhanced by hardening after the attachment of each new tape 1.

Resins of the phenol resin or polyurethane classes are advantageously utilized as the carbonizable glue. Thermally or catalytically hardening systems as well as cold hardening systems can be used for the hardening.

Carbon fiber reinforced plastics (CFRP) whose plastic matrix includes a carbonizable material are suitable as the surface formations containing carbon fiber.

Carbonizable materials refers to materials including a non-volatile carbon residue with a carbon fraction of at least 25 mass percent given temperature processing under non-oxidizing conditions above 750° C. Resins of the phenol resin class, particularly the resol class, or furfuryl alcohol resins, or resins of the polyurethane class are typically used as carbonizable plastics.

The glue and the matrix of the surface formations containing carbon fibers advantageously include the same polymer systems. It is also possible and preferable to utilize materials as the plastic matrix that plasticize under the effect of heat and that can produce a glued joint in the region of the contact zones 4, 4. A separate coat of glue is thus unnecessary.

Figure 8:
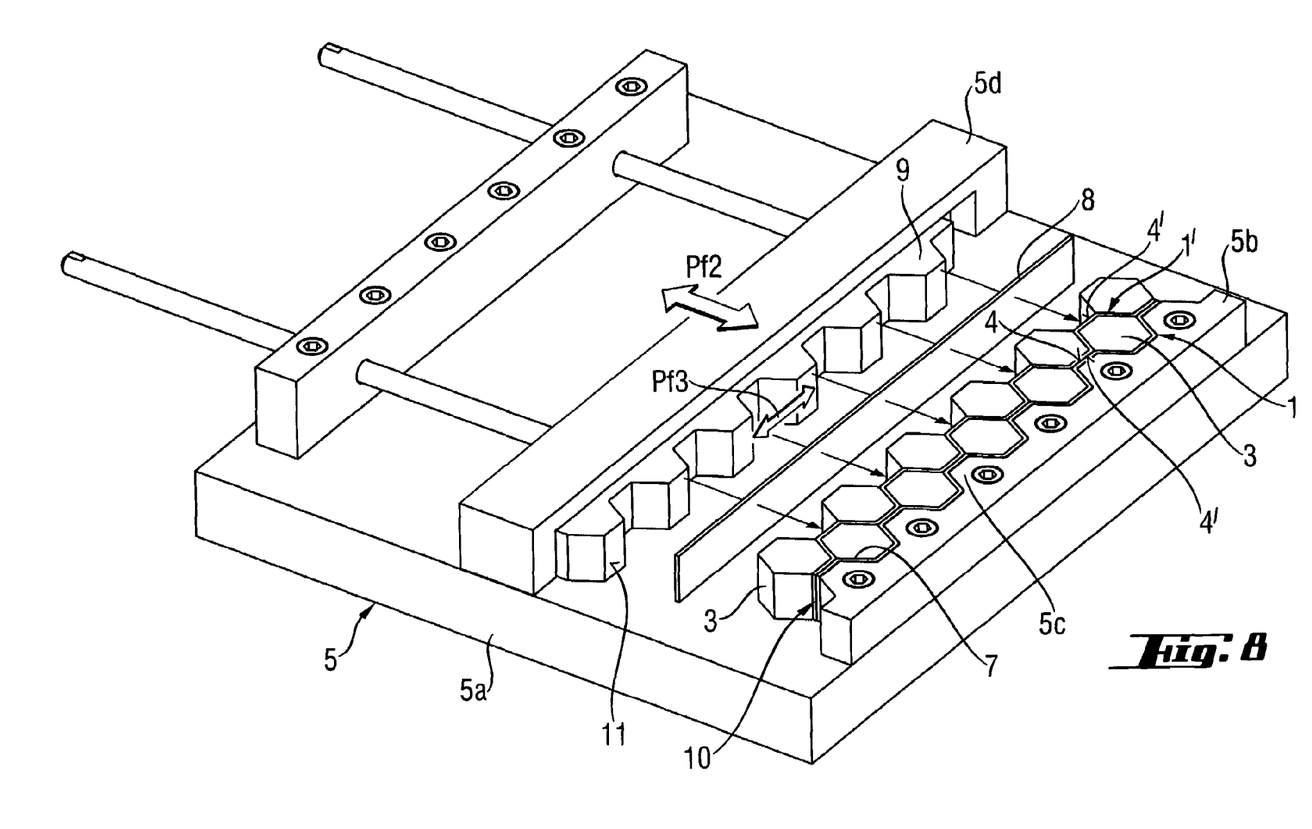
FIG. 8 is a perspective view showing an agglutination of moldable fiber formations into a second embodiment of a honeycomb structure.

According to a second variant of the method, unlike in the first variant, the flat fiber formations 8 containing carbon fibers that are used are still moldable and thermally hardenable, and they acquire their final shape as tapes 1, 1 for the first time in the clamping device 5, where they are also hardened for the first time. The separate processes in the first variant of producing corrugated, bent or meandering fiber formations and building the structure from these fiber formations are performed here in one step in a clamping device 5 that is provided with a heatable die 6. The moldable fiber formations 8 that are about to be added are pressed onto the front side of the already formed prebody 10, which contains free graphite spacers 3, in the region of the contact zones 4 by using a heated die 9. The spacers 3 are shaped in such a way that they interact with the die 9 as counterparts in the shaping of the surface formation 8. The moldable fiber formation is held the desired distance from the prebody 10 by the graphite spacers 3 in the regions of the front side of the prebody 10 that are not contact zones 4 (FIG. 8).

When producing one of the structures represented in FIGS. 4 to 7, each new tape-type moldable fiber formation 8 must be shaped as a mirror image of the previous moldable fiber formation 8. Such alternating shaping of the fiber formations 8 into tapes 1 requires that the die 9 be movable parallel to the tape plane (arrow Pf 3) so that, following the pressing of a moldable fiber formation 8, the position of the projections 11 of the die 9 can be changed in such a way that the next moldable fiber formation 8 acquires a shape that is the mirror-image of the shape of the previous moldable fiber formation.

Expediently, each individual moldable fiber formation 8 that is added is at least partially thermally hardened, because this brings about adhesion in the region of the contact zones 4 of the prebody 10 and stiffening of the prebody 10, which facilitates its subsequent construction. In this method, it is advantageous to utilize a heatable die 9 and thermally hardening plastics or binders. Generally, the same materials that were described in the first variant are utilized as plastics or binders.

But a catalytic hardening of the plastics or binders is also possible, although a more precise process guidance is required.

Prepregs, what are known as UD tapes (parallel continuous fibers in the form of tapes that are solidified with binders), weaves, braids, knitted fabrics, and felts are suitable as surface formations containing carbon fibers for producing the inventive components 6.

The reinforcing fibers of the surface formations containing carbon fibers can be aligned unidirectionally or multidirectionally. The components 6 can be purposefully reinforced in preferred spatial directions based on the selection of preference directions of the fibers.

According to one of the direction variants, primarily unidirectionally fiber-reinforced CFRP tapes are utilized whose reinforcement fibers extend parallel to the longitudinal axis of the tapes. A component so constructed is suitable as a carrier for heavy workpieces, because it includes a particularly high rigidity perpendicular to the load direction.

For another direction variant, tapes or moldable surface formations with bidirectional fiber reinforcement are utilized. "Bidirectional" means that a portion of the fibers is oriented not parallel to the longitudinal axis of the tape but rather at an angle of between 20° and 160° to the longitudinal axis of the tape, i.e. of the moldable surface formation. A more uniform reinforcing effect is thereby achieved, which is needed for employment as a supporting wall, for example.

With a bi-directional fiber alignment, the share of fibers oriented parallel to the longitudinal axis exceeds the share of fibers oriented in other directions.

An advantage of the method is that regions with different fiber orientations which are tailored to the type of load can easily be set. Tapes with different fiber orientations can be juxtaposed in any order.

The first carbonization occurs subsequent to the hardening of all plastics and binders, which are present in part as glue, in part as a matrix of the surface formations containing carbon fibers. The volatile components are thereby broken off, and a high-temperature-proof carbon matrix is formed. The body so formed is referred to hereinafter as the CFRC body.

It is inventively provided that the carbonization of the prebody 10 is performed in the fixed state with graphite spacers 3 and clamping device 5.

The fixing guarantees that the shrinkage of the prebody material in connection with the carbonization does not lead to warping or distortion of the CFRC body.

The carbonization commences at temperatures above 750° C. under non-oxidizing conditions and is typically performed at temperatures in the range between 900 and 1200° C. Graphiting can potentially occur in or after this step, which is achieved by a thermal processing in the range of approx. 1800 to 2400° C.

As is generally known, the graphiting of the carbon advantageously improves the oxidation resistance and wear resistance.

The composite materials that are available subsequent to the first carbonization and graphiting generally still lack sufficient stability and material density for the intended employment of the components. It is therefore advantageous to carry out one or more post-compactions with carbon. This can be accomplished by gas phase deposition or liquid phase impregnation with carbon precursors followed by carbonization.

The pitches, polymers, or resins that are customary in the production of CFRC materials can be used as the carbon precursors.

The post-compaction and subsequent carbonization are also inventively performed in the fixing device. Although the CFRC body has already achieved a certain stability by the end of the first carbonization, the fixing during the subsequent carbonization, at least the second, has proven highly advantageous for the dimensional stability of the component. Without fixation, formations that have spread across a wide surface, in particular, frequently show warping or distortion even after several compaction cycles.

The graphiting that may be carried out as warranted can also be performed without removing the CFRC body from the fixation.

A further advantage of the graphite spacers 3 and clamping device 5 remaining in the post-compaction and post-carbonization steps is that the CFRC body has relatively smooth surfaces. This is advantageous particularly for employment as a workpiece carrier or batch rack, because the pollutants and contaminants that arise in the thermal processes that are carried out hardly adhere at all.

Furthermore, at least in the second shaping variant, surface profiles such as grooves, noses or recesses can easily be molded onto the tapes with the aid of the spacers 3. In the subsequent post-compactions, these surface profiles cannot be filled or leveled with freshly deposited carbon material, because the spacers 3 remain in the CFRC body until the end. Suitable surface profiles can be employed as fixation points for screwing or otherwise fastening additional components.

Spacers 3 and clamping device 5 are composed of ultra fire-resistant material. Beyond this, the material of the contact surfaces to the green body or CFRC body may be only an extraordinarily low adhesion to the carbon of the CFRC body. At least the direct contact surfaces of the spacers 3 and the clamping device 5 to the green body or CFRC body are thus constructed from graphite. CFRC materials, among others, can be employed for the components of the clamping device 5 that do not make direct contact with the green body or CFRC body. At least the spacers 3 and/or the die 9 that is utilized in the second variant of the method are constructed entirely from graphite.

CFRC materials that are obtainable by carbonization can be improved with respect to their oxidation resistance and wear resistance by graphiting and particularly by silication.

It is therefore provided that the CFRC body or components are graphited and/or silicated in the final step.

The silication is preferably performed as liquid silication with a silicon melt. A matrix containing silicon and silicon carbide is formed at least in a layer of the component near the surface. A deep silication can also be performed if necessary, so that the component is formed completely of a C/SiC material.

The wall thickness of the inventively produced components is between 0.7 and 30 mm, depending on the intended use.

Another aspect of the invention relates to the possibilities for utilizing the components. Besides the above-described utilization as a batch rack (workpiece carrier) in the performing of thermal treatments on workpieces, a particularly important application includes utilization as components with a high thermal capacity as skeleton parts or surface parts in the aerospace field.

The components can be utilized as a core element of sandwich structures.

Based on the small and uniform thermal expansion of the inventive components, utilization in precision machines and as carriers for optical components and mirror constructions, for instance satellite mirrors, are among the preferred applications.

We claim:

1. A method for producing components from high-temperature-proof fiber reinforced composite ceramic, which comprises the steps:
   producing shaped tapes by die pressing moldable surface formations containing carbon fibers, each of the tapes having at least one surface, and shaping the tapes occurring in a clamping device formed substantially of graphite to secure the tapes and the prebody formed therefrom, by pressing a die profiled at least on one side onto the moldable surface formations containing the carbon fibers, where at least two of the shaped tapes are juxtaposed by having the surfaces of the at least two of the shaped tapes facing one another and adjoining portions of the surfaces of the shaped tapes facing one another at contact zones, separating a region of each of the shaped tapes outside the contact zones from adjoining tapes with graphite spacers, and including an adhesive at least on the portions of the shaped tapes forming the contact zones, joining the carbon fibers, and molding the shaped tapes with pressure during heating;
   producing a force-locking connection between the tapes in the portions of the shaped tapes at the contact zones to form a prebody by one of:
      heating and simultaneous solidifying under thermal and pressure influences, and
      hardening;
   carbonizing the prebody at a temperature between 750 and 1200° C. in a non-oxidizing atmosphere;
   at least once post-compacting the prebody by introducing a substance forming a carbon residue when heated in the non-oxidizing atmosphere, and subsequently carbonizing the prebody.

2. The method according to claim 1, wherein the shaped tapes are corrugated.

3. The method according to claim 1, wherein the shaped tapes are bent.

4. The method according to claim 1, wherein the shaped tapes are meandering.

5. The method according to claim 1, wherein the adhesive is a glue.

6. The method according to claim 1, wherein the adhesive is a binder.

7. The method according to claim 6, which further comprises using carbonizable resins as the binder.

8. The method according to claim 1, wherein the introducing of the substance involves infiltrating the prebody with the substance.

9. The method according to claim 1, wherein the introducing of the substance involves impregnating the prebody with the substance.

10. The method according to claim 1, wherein the substance being introduced is meltable.

11. The method according to claim 1, wherein the substance being introduced is gaseous.

12. The method according to claim 1, which further comprises including a hardenable binder in the shaped tapes.

13. The method according to claim 1, which further comprises pressing the moldable surface formation containing the carbon fibers with the die having a profile at least on one side onto a front side of a prebody including spacers, the spacers being partly-open on a side facing the moldable surface formations containing the carbon fibers to form a tape corrugated in conformance with the profile of the die.

14. The method according to claim 13, which further comprises joining the formed tape to the prebody by thermal hardening.

15. The method according to claim 14, which further comprises introducing heat required for the thermal hardening at least partly by the die.

16. The method according to claim 1, which further comprises forming the die from graphite.

17. The method according to claim 1, which further comprises aligning a majority of the carbon fibers parallel to the moldable surface formations containing the carbon fibers.

18. The method according to claim 1, which further comprises aligning the carbon fibers partly parallel to and partly at an angle of between 20° and 160° to a longitudinal axis of the tapes.

19. The method according to claim 1, which further comprises aligning the carbon fibers partly parallel to and partly at an angle of between 20° and 160° to the moldable surface formations containing the carbon fibers.

20. The method according to claim 1, which further comprises using carbonizable resins for the post-compacting step.

21. The method according to claim 1, which further comprises, after the last carbonizing or graphiting, performing a melt infiltration with a carbide forming element and a subsequent reaction to form a matrix containing the carbide forming element and a carbide thereof at least in an outer layer of the component.

22. The method according to claim 21, which further comprises using silicon as the carbide forming element.

23. The method according to claim 21, which further comprises performing the melt infiltration and subsequent reaction to penetrate entirely the matrix with the carbide forming element and the carbide thereof.

24. A method for producing components from high-temperature-proof fiber reinforced composite ceramic, which comprises the steps:

producing shaped tapes from moldable surface formations containing carbon fibers and having a majority of the carbon fibers aligned parallel to the longitudinal axis of the shaped tapes, each of the shaped tapes having at least one surface;

juxtaposing at least two of the shaped tapes by placing the surfaces of the at least two of the shaped tapes facing one another and adjoining portions of the surfaces of the shaped tapes facing one another at contact zones, inserting the shaped tapes into a clamping device formed substantially of graphite to secure the tapes and a prebody formed therefrom, separating a region of each of the shaped tapes outside the contact zones from adjoining tapes with graphite spacers, including an adhesive at least on the portions of the shaped tapes forming the contact zones, joining the carbon fibers, and molding the shaped tapes with pressure during heating;

producing a force-locking connection between the tapes in the portions of the shaped tapes at the contact zones to form the prebody by one of:
  heating and simultaneous solidifying under thermal and pressure influences, and
  hardening;

carbonizing the prebody at a temperature between 750 and 1200° C. in a non-oxidizing atmosphere; and at least once post-compacting the prebody by introducing a substance forming a carbon residue when heated in the non-oxidizing atmosphere, and subsequently carbonizing the prebody.

* * * * *